United States Patent [19]

Teller et al.

[11] 3,926,984

[45] Dec. 16, 1975

[54] 7-[2-(2-THIOXO-4-THIAZOLIN-3-YL)-ACETAMIDO] CEPHALOSPORANIC ACID DERIVATIVES

[75] Inventors: Daniel M. Teller, Devon; John H. Sellstedt, Pottstown; Charles J. Guinosso, King of Prussia, all of Pa.

[73] Assignee: American Home Products Corporation, New York, N.Y.

[22] Filed: Oct. 2, 1974

[21] Appl. No.: 511,155

[52] U.S. Cl............ 260/243 C; 260/306.7; 424/246
[51] Int. Cl.² ............... C07D 501/34; C07D 501/46
[58] Field of Search .............................. 260/243 C

[56] References Cited
UNITED STATES PATENTS
3,627,760   12/1971   Bickel et al. ................... 260/243 C FOREIGN PATENTS OR APPLICATIONS
1,816,824   7/1969   Germany Primary Examiner—Donald G. Daus
Assistant Examiner—Diana G. Rivers
Attorney, Agent, or Firm—Richard K. Jackson

[57] ABSTRACT

The invention presents gram-positive and gram-negative antibacterial agents of the structural formula

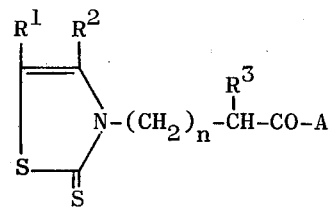

in which
$R^1$ and $R^2$ are independently —H or alkyl of 1 to 6 carbon atoms, and when taken together, $R^1$ and $R^2$ are trimethylene;
$R^3$ is —H, alkyl of 1 to 6 carbon atoms or methylthioethyl;
$n$ is 0 or 1, with the proviso that when $n$ is 1, $R^3$ is —H; and
A is a 7-amino-cephalosporin or 6-amino-penicillin moiety.

13 Claims, No Drawings

7-[2-(2-THIOXO-4-THIAZOLIN-3-YL)-ACETAMIDO] CEPHALOSPORANIC ACID DERIVATIVES

DESCRIPTION OF THE INVENTION

In accordance with this invention there is provided antibacterial agents of the formula:

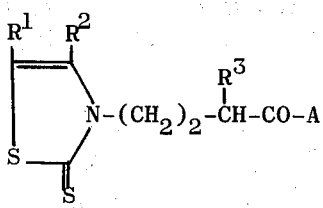

in which
$R^1$ and $R^2$ are independently —H or alkyl of 1 to 6 carbon atoms, and when taken together, $R^1$ and $R^2$ are trimethylene;
$R^3$ is —H, alkyl of 1 to 6 carbon atoms or methylthiomethyl;
$n$ is 0 or 1, with the proviso that when $n$ is 1, $R^3$ is —H; and
A is a 7-amino-cephalosporin or 6-amino-penicillin moiety.

The 7-amino-cephalosporin moiety described in the preceding paragraph as A presents the structural formula:

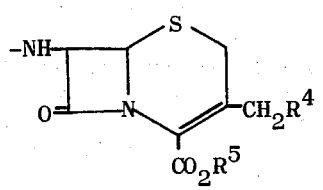

in which
$R^4$ is —H, (lower)alkanoyloxy,

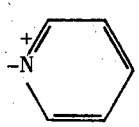

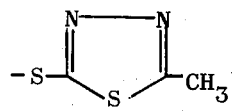 or 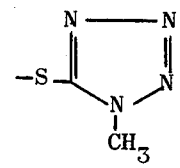

and
$R^5$ is —H, an alkali metal or the ammonium ion. The term "(lower)alkanoyloxy" means the lower fatty acid acyloxy radicals such as acetoxy, propionyloxy, butyroyloxy, valeroyloxy, and the like.

The 6-amino-penicillin moiety referred to above as A presents the structural formula:

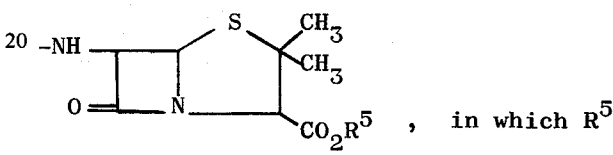, in which $R^5$ in which $R^5$ has the definition stated above.

The compounds of this invention are prepared by coupling an acid of the formula:

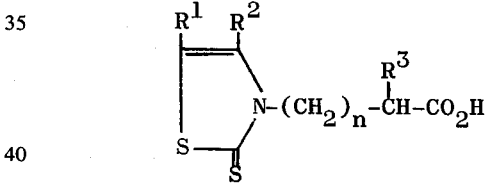

in which $R^1$, $R^2$, $R^3$ and $n$ are defined above, with a 7-amino-cephalosporin or 6-amino-penicillin derivative via the conventional methods and employing conventional condensing agents such as isobutyl chloroformate, dicyclohexyl carbodiimide or carbonyl diimidazole, as disclosed by Micetich, et al., J. Med. Chem. 15, 333 (1972); Spencer et al., J. Med. Chem. 9, 746 (1966) and U.S. Pat. No. 3,338,896.

The acids referred to in the preceding paragraph are prepared by the method of Mathes et al., J.A.C.S. 72, 1879 (1950) via the reaction

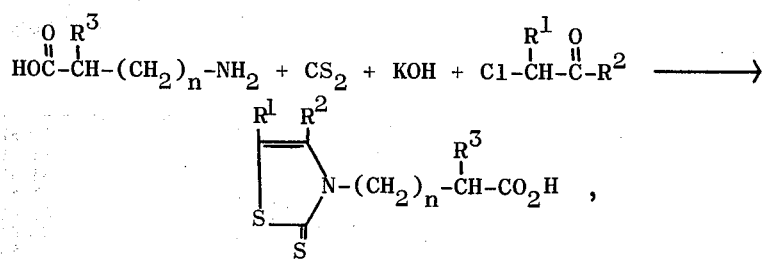

wherein $R^1$, $R^2$, $R^3$ and $n$ are defined above.

The compounds of this invention are antibacterial agents effective against gram-positive and gram-negative test organisms as well as penicillin resistant staphylococcus at an inhibitory concentration at or below 250 micrograms per milliliter using the well-known and scientifically accepted agar serial dilution technique. Thus, the compounds of this invention are useful in controlling bacterial infections amenable to treatment with penicillins and cephalosporins by inhibiting their growth.

The following examples are presented for the puspose of illustrating the invention and are not to be construed as limitations on the true scope of the contribution. The biological activity data presented at the conclusion of each example illustrate the compound's activity against specific bacteria of the designated strain in terms of the minimum inhibitory concentration of the compound in micrograms per milliliter to completely inhibit the test organism. The abbreviations for the bacterium are:

ST AU - *Staphylococcus aureus*
BA SU - *Bacillus subtilis*
NE CA - *Neisseria catarrhalis*
HE SP - *Herellea species*
ES CO - *Escherichia coli*
PR VU - *Proteus vulgaris*
SA PA - *Salmonella paratyphi*
BO BR - *Bordetella brochiseptica*
EN AE - *Enterobacter aerogenes*
ES IN - *Escherichia intermedia*
KL PN - *Klebsiella pneumoniae*

In the working examples, the expression ACA refers to aminocephalosporanic acid, ADCA refers to aminodesacetoxy-cephalosporanic acid, and APA refers to aminopenicillanic acid.

EXAMPLE 1

7-[2-(4-Methyl-2-thioxo-4-thiazolin-3-yl)acetamido]-cephalosporanic acid.

A solution of 4-methyl-2-thioxo-4-thiazoline-3-acetic acid (1.89 g, 0.01 moles) in dry tetrahydrofuran (40 ml) containing triethylamine (1.40 ml) is cooled to −10°C. Isobutyl chloroformate (1.32 ml) is added all at once under nitrogen and the mixture stirred at −10°C under nitrogen for 10 minutes. A solution of 7-ACA (2.72 g, 0.01 moles) in tetrahydrofuran/water (1:1, 36 ml) containing N,N-diisopropylethylamine (1.71 ml) is cooled to 0°C and added rapidly to the above mixture. The temperature of the mixture is maintained at 5°C for one hour and then 20°C for another hour. The tetrahydrofuran is evaporated in vacuo at a temperature below 40°C. A mixture of water (300 ml) and ethyl acetate (80 ml) is added to the residue, the mixture shaken thoroughly and the organic layer discarded. Ethyl acetate (400 ml) is added to the aqueous layer, the mixture cooled to 5° C and acidified to pH 2.0 with 10% hydrochloric acid. A precipitate forms, which is filtered off, slurried in water, acidified to pH 2.0 with 10% hydrochloric acid (300 ml) containing ethyl acetate (100 ml) and filtered to give the title compound, 1.80 g; m.p. 177°–180°C (d); $\lambda_{max}^{KBr}$ 5.60, 5.77, 5.87, 6.00 μ; NMR has 2.00 and 2.19 ppm singlets.

Elemental Analysis for $C_{16}H_{17}N_3O_6S_3$: Calc'd: C, 43.33; H, 3.86; N, 9.47; S, 21.69. Found: C, 42.83; H, 3.84; N, 9.26; S, 20.94.

The sodium salt of the above compound is prepared by slurrying the compound (3.45 g, 0.0078 moles) in water (70 ml) at 5°C and adding dropwise over 15 minutes 1M sodium hydroxide (7.78 ml, 0.0078 moles) giving a final pH 5.4. The mixture is filtered and freeze-dried to give the sodium salt of the title compound, 2.55 g yellow solid; mp. 180°–220°C. (d); $\lambda_{max}^{KBr}$ 5.68, 5.99 μ; NMR has 2.07 and 2.18 ppm singlets.

Elemental Analysis for $C_{16}H_{16}N_3O_6S_3Na.1H_2O$: Calc'd: C, 39.75; H, 3.78; N, 8.69; S, 19.89; $H_2O$, 3.73. Found: C, 39.35; H, 3.71; N, 8.35; S, 19.76; $H_2O$, 5.00.

| BA SU | 6633   | .0152 |
| ST AU | 6539P  | .244  |
| ST AU | Smith  | .244  |
| ST AU | CHP    | .976  |
| ST AU | 53–180 | .488  |
| NE CA | 8193   | 31.3  |
| ES CO | 9637   | 15.6  |
| SA PA | 11737  | 3.90  |
| KL PN | 10031  | 3.90  |
| BO BR | 4617   | 250   |
| PR VU | 6896   | 31.3  |

The compound of example 1 possess in vivo activity against *Escherichia coli* 920 and *Proteus vulgaris* PR347 at a curative dose ($CD_{50}$) of 5.65 milligrams and 6.67 milligrams per mouse, respectively, as determined by the subcutaneous administration of the compound of example 1 at 0 time and 6 hours after intraperitoneal infection with the infective agent.

EXAMPLE 2

3-Methyl-7-[2-(4-methyl-2-thioxo-4-thiazolin-3-yl)acetamido]-8-oxo-5-thia-1-azabicyclo[4.2.0]oct-2-ene-2-carboxylic acid.

Using the method described in Example 1 but substituting 7-ADCA (2.14 g, 0.01 moles) for 7-ACA gives the title compound, 0.74 g; mp. 232°–234°C.(d); $\lambda_{max}^{KBr}$ 5.62, 5.79, 5.96 μ; NMR has 2.05 and 2.22 ppm singlets.

Elemental Analysis for $C_{14}H_{15}N_3O_4S$: Calc'd: C, 43.64; H, 3.92; N, 10.91; S, 24.96. Found: C, 43.84; H, 4.07; N, 10.83; S, 24.24.

The sodium salt of the above compound is prepared by slurrying the compound (5.0 g, 0.013 moles) in water (80 ml) at 5°C and adding dropwise over 15 minutes 1M sodium hydroxide (13.0 ml, 0.013 moles) giving a final pH 6.2. The mixture is filtered and freeze-dried to give the sodium salt of the title compound, 4.70 g colorless solid; mp. 245°–255°C.(d); $\lambda_{max}^{KBr}$ 5.60, 5.81, 6.19 μ; NMR has 1.95 and 2.17 ppm singlets.

Elemental Analysis for $C_{14}H_{14}N_3O_4S_3Na.1H_2O$: Calc'd: C, 39.55; H, 3.79; N, 9.89; S, 22.62; $H_2O$, 4.24. Found: C, 38.89; H, 3.62; N, 9.58; S, 20.76; $H_2O$, 6.52.

| BA SU | 6633   | .976 |
| ST AU | 6538P  | 3.90 |
| ST AU | Smith  | 3.90 |
| ST AU | CHP    | 15.6 |
| ST AU | 53–180 | 7.81 |
| SA PA | 11737  | 125  |
| KL PN | 10031  | 125  |

EXAMPLE 3

6-[2-(4-Methyl-2-thioxo-4-thiazolin-3-yl)acetamido]penicillanic acid.

Using the method described in Example 1 but substituting 6-APA (2.16 g, 0.01 moles) for 7-ACA does not give a precipitate on acidifying to pH 2.0 with 10% hydrochloric acid. Therefore, the organic layer is separated, the aqueous layer extracted with ethyl acetate (120 ml) the organic layer and extract combined, washed with brine, dried over anydrous sodium sulfate and evaporated in vacuo at a temperature below 40°C. The residue is dissolved in methylene chloride (50 ml) and added dropwise to pentane (500 ml) with vigorous stirring to give the title compound, 2.80 g.; mp. 162°–166°C.(d); $\lambda_{max}^{KBr}$ 5.57, 5.72, 5.90 $\mu$; NMR has 1.52 and 1.17 ppm singlets.

Elemental Analysis for $C_{14}H_{17}N_3O_4S_3$: Calc'd: C, 43.41; H, 4.42; N, 10.85; S, 24.84. Found: C, 42.22; H, 4.51; N, 9.96; S, 23.32.

| BA SU | 6633 | .122 |
| ST AU | 6538P | .122 |
| ST AU | Smith | .122 |
| ST AU | CHP | 7.81 |
| ST AU | 53–180 | 31.3 |
| NE CA | 8193 | 1.95 |
| ES CO | 9637 | 125 |
| SA PA | 11737 | 15.6 |
| PR VU | 6896 | 125 |
| HE SP | 9955 | 62.5 |

EXAMPLE 4

7-[3-(4-Methyl-2-thioxo-4-thiazolin-3-yl)propionamido]cephalosporanic acid.

Using the method described in Example 3 but substituting 7-ACA (2.72 g, 0.01 moles) for 6-APA and 3-(4-methyl-2-thioxo-4-thiazolin-3-yl)propionic acid (2.30 g, 0.01 moles) for 2-(4-methyl-2-thioxo-4-thiazolin-3-yl)acetic acid and precipitating from methylene chloride (35 ml) by adding dropwise to pentane (500 ml) gives the title compound, 3.45 g; mp. 111°–114°C.; $\lambda_{max}^{KBr}$ 5.52, 5.65, 5.78, 5.95 $\mu$; NMR has 2.03 and 2.34 ppm singlets.

Elemental Analysis for $C_{17}H_{19}N_3O_6S_3$: Calc'd: C, 44.62; H, 4.18; N, 9.18; S, 21.02. Found: C, 44.44; H, 4.36; N, 9.00; S, 21.24.

| BA SU | 6633 | .244 |
| ST AU | 6538P | .244 |
| ST AU | Smith | .244 |
| ST AU | CHP | 1.95 |
| ST AU | 53–180 | 1.95 |
| NE CA | 8193 | 62.5 |
| ES CO | 9637 | 62.5 |
| SA PA | 11737 | 15.6 |
| KL PN | 10031 | 31.3 |
| PR VU | 6896 | 62.5 |

EXAMPLE 5

3-Methyl-7-[3-(4-methyl-2-thioxo-4-thiazolin-3-yl)propionamido]-8-oxo-5-thia-1-azabicyclo[4.2.0]oct-2-ene-2-carboxylic acid.

Using the method described in Example 3 but substituting 7-ADCA (2.14 g, 0.01 mole) for 6-APA and 3-(4-methyl-2-thioxo-4-thiazolin-3-yl)propionic acid (2.03 g, 0.01 moles) for 2-(4-methyl-2-thioxo-4-thiazolin-3-yl)acetic acid and triturating the residue with diethyl ether (50ml) gives the title compound, 2.59 g; mp. 195°–198°C. (d); $\lambda_{max}^{KBr}$ 5.62, 5.99 $\mu$; NMR has 2.02 and 2.31 ppm singlets.

Elemental Analysis for $C_{15}H_{17}N_3O_4S_3$: Calc'd: C, 45.12; H, 4.29; N, 10.52; S, 24.10. Found: C, 45.73; H, 4.53; N, 10.09; S, 21.71.

| BA SU | 6633 | 3.90 |
| ST AU | 6538P | .976 |
| ST AU | Smith | .488 |
| ST AU | CHP | 7.81 |
| ST AU | 53–180 | 7.81 |
| NE CA | 8193 | 125 |
| SA PA | 11737 | 250 |
| KL PN | 10031 | 62.5 |
| PR VU | 6896 | 250 |

EXAMPLE 6

6-[3-(4-Methyl-2-thioxo-4-thiazolin-3-yl)propionamido]penicillanic acid.

Using the method described in Example 3 but substituting 4-methyl-2-thioxo-4-thiazoline-3-propionic acid (2.03 g, 0.01 mole) for 4-methyl-2-thioxo-4-thiazoline-3-acetic acid gives the title compound, 3.23 g; mp. 87°–91°C; $\lambda_{max}^{KBr}$ 5.62, 5.70, 6.02 $\mu$; NMR has 1.48, 1.60, 2.30 ppm singlets.

Elemental Analysis for $C_{15}H_{19}N_3O_4S_3$: Cal'd: C, 44.89; H, 4.77; N, 10.47; S, 24.00. Found: C, 43.46; H, 5.20; N, 9.88; S, 26.49.

| BA SU | 6633 | .488 |
| ST AU | 6538P | .122 |
| ST AU | Smith | .122 |
| ST AU | CHP | 7.81 |
| ST AU | 53–180 | 62.5 |
| NE CA | 8193 | 1.95 |
| ES CO | 9637 | 125 |
| SA PA | 11737 | 31.3 |
| PR VU | 6896 | 250 |
| HE SP | 9955 | 125 |

EXAMPLE 7

7-[2-(3,4,5,6-Tetrahydro-2-thioxo-2H-cyclopentathiazol-3-yl)acetamido]cephalosporanic acid.

Using the method described in Example 5 but substituting 7-ACA (2.72, 0.01 moles) for 7-ADCA and 3,4,5,6-tetrahydro-2-thioxo-2H-cyclopentathiazole-3-acetic acid (2.15 g, 0.01 moles) for 4-methyl-2-thioxo-4-thiazoline-3-propionic acid gives the title compound, 0.95 g; mp 152°–155°C.; $\lambda_{max}^{KBr}$ 5.59, 5.68, 5.82, 5.97 $\mu$; NMR has 2.00 ppm singlet.

Elemental Analysis for $C_{18}H_{19}N_3O_6S_3$: Calc'd: C, 46.04; H, 4.08; N, 8.95; S, 20.49. Found: C, 46.06; H, 4.34; N, 8.74; S, 20.67.

| | | |
|---|---|---|
| BA SU | 6633 | .061 |
| ST AU | 6538P | .244 |
| ST AU | Smith | .244 |
| ST AU | CHP | .976 |
| ST AU | 53–180 | .488 |
| NE CA | 8193 | 15.6 |
| ES CO | 9637 | 62.5 |
| SA PA | 11737 | 62.5 |
| KL PN | 10031 | 7.81 |
| PR VU | 6896 | 31.3 |

EXAMPLE 8

3-Methyl-8-oxo-7-[2-(3,4,5,6-tetrahydro-2-thioxo-2H-cyclopentathiazol-3-yl)acetamido]-5-thia-1-azabicyclo[4.2.0]oct-2-ene-2-carboxylic acid.

Using the method described in Example 1 but substituting 7-ADCA (2.14 g, 0.01 moles) for 7-ACA and 3,4,5,6-tetrahydro-2-thioxo-2H-cyclopentathiazole-3-acetic acid (2.15 g, 0.01 moles) for 4-methyl-2-thioxo-4-thiazoline-3-acetic acid gives the title compound, 1.70 g; mp. 192°–196°C.; $\lambda_{max}^{KBr}$ 5.51, 5.60 (shoulders), 5.80, 5.89 $\mu$; NMR has 2.00 $\mu$ singlet.

Elemental Analysis for $C_{18}H_{19}N_3O_6S_3$: Calc'd: C, 46.04; H, 4.08; N, 8.95; S, 20.49. Found: C, 46.06; H, 4.34; N, 8.74; S, 20.67.

| | | |
|---|---|---|
| BA SU | 6633 | .976 |
| ST AU | 6538P | 1.95 |
| ST AU | Smith | .976 |
| ST AU | CHP | 7.81 |
| ST AU | 53–180 | 3.90 |
| NE CA | 8193 | 250 |
| KL PN | 10031 | 125 |

EXAMPLE 9

6-[2-(3,4,5,6-Tetrahydro-2-thioxo-2H-cyclopentathiazol-3-yl)acetamido]penicillanic acid.

Using the method described in Example 3 but substituting 3,4,5,6-tetrahydro-2-thioxo-2-H-cyclopentathiazol-3-acetic acid (2.15 g, 0.01 moles) for 4-methyl-2-thioxo-4-thiazoline-3-acetic acid gives the title compound, 3.22 g; mp. 120°–124°C.; $\lambda_{max}^{KBr}$ 5.58, 5.70, 5.88 $\mu$; NMR has 1.54 and 1.67 ppm singlets.

Elemental Analysis for $C_{16}H_{19}N_3O_4S_3$: Calc'd: C, 46.49; H, 4.63; N, 10.17; S, 23.28. Found: C, 46.30; H, 4.77; N, 9.88; S, 22.18.

| | | |
|---|---|---|
| BA SU | 6633 | .976 |
| ST AU | 6538P | .122 |
| ST AU | Smith | .122 |
| ST AU | CHP | 3.90 |
| ST AU | 53–180 | 62.5 |
| NE CA | 8193 | 1.95 |
| ES CO | 9637 | 250 |
| SA PA | 11737 | 125 |
| PR VU | 6896 | 250 |
| HE SP | 9955 | 125 |

EXAMPLE 10

7-[2-(4-Methyl-2-thioxo-4-thiazolin-3-yl)propionamido]cephalosporanic acid.

Using the method described in Example 5 but substituting 7-ACA (2.72 g, 0.01 moles) for 7-ADCA and α,4-dimethyl-2-thioxo-4-thiazoline-3-acetic acid (2.03 g, 0.01 moles) for 4-methyl-2-thioxo-4-thiazoline-3-propionic acid gives the title compound, 1.90 g; mp. 115°–120°C; $\lambda_{max}^{KBr}$ 5.03, 5.22, 5.84 (shoulder), 6.00 $\mu$ shoulder; NMR has 2.01 and 2.26 ppm singlets.

Elemental Analysis for $C_{17}H_{19}N_3O_6S_3$: Calc'd: C, 44.62; H, 4.18; N, 9.18; S, 21.02. Found: C, 45.12; H, 4.54; N, 8.90; S, 20.80.

| | | |
|---|---|---|
| BA SU | 6633 | 1.95 |
| ST AU | 6538P | 7.81 |
| ST AU | Smith | 7.81 |
| ST AU | CHP | 31.3 |
| ST AU | 53–180 | 31.3 |
| ES CO | 9637 | 31.3 |
| ES IN | 65–1 | 125 |
| SA PA | 11737 | 15.6 |
| EN AE | 13048 | 250 |
| KL PN | 10031 | 15.6 |
| PR VU | 6896 | 31.3 |

EXAMPLE 11

3-Methyl-7-[2-(4-methyl-2-thioxo-4-thiazolin-3-yl)propionamido]-8-oxo-5-thia-1-azabicyclo[4.2.0]oct-2-ene-2-carboxylic acid.

Using the method described in Example 5 but substituting α,4-dimethyl-2-thioxo-4-thiazoline-3-acetic acid (2.03 g, 0.01 moles) for 4-methyl-2-thioxo-4-thiazoline-3-propionic acid gives the title compound, 1.75 g; mp. 108°–109°C.; $\lambda_{max}^{KBr}$ 5.65, 5.80 (shoulder), 5.90 $\mu$; NMR has 1.63, 1.74 and 2.17 ppm singlets.

Elemental Analysis for $C_{15}H_{17}N_3O_4S_3$: Calc'd: C, 45.12; H, 4.29; N, 10.52; S, 24.10. Found: C, 43.45; H, 4.83; N, 8.60; S, 19.64.

| | | |
|---|---|---|
| BA SU | 6633 | 7.81 |
| ST AU | 6538P | 31.3 |
| ST AU | Smith | 15.6 |
| ST AU | CHP | 125 |
| ST AU | 53–180 | 125 |
| KL PN | 10031 | 250 |

EXAMPLE 12

6-[2-(4-Methyl-2-thioxo-4-thiazolin-3-yl)propionamido]penicillanic acid.

Using the method described in Example 5 but substituting 6-APA (2.16 g, 0.01 mole) for 7-ADCA and α,4-dimethyl-2-thioxo-4-thiazoline-3-acetic acid (2.03 g, 0.01 moles) for 4-methyl-2-thioxo-4-thiazoline-3-propionic acid gives the title compound, 2.54 g; mp. 144°–149°C. (d); $\lambda_{max}^{KBr}$ 5.55, 5.72 (shoulder), 5.88 $\mu$; NMR has 1.47, 1.58, 2.27 ppm singlets.

Elemental Analysis for $C_{15}H_{19}N_3O_4S_3$: Calc'd: C, 44.89; H, 4.77; N, 10.47; S, 24.00. Found: C, 45.39; H, 5.07; N, 10.51; S, 22.54.

| | | |
|---|---|---|
| BA SU | 6633 | .244 |
| ST AU | 6538P | .488 |
| ST AU | Smith | .488 |
| ST AU | CHP | 31.3 |
| ST AU | 53–180 | 125 |
| NE CA | 8193 | 7.81 |
| SA PA | 11737 | 125 |
| PR VU | 6896 | 250 |
| HE SP | 9955 | 125 |

EXAMPLE 13

7-[2-(2-Thioxo-4-thiazolin-3-yl)acetamido]cephalosporanic acid.

Using the method described in Example 5 but substituting 7-ACA (2.72 g, 0.01 moles) for 7-ADCA and 2-thioxo-4-thiazolidine-3-acetic acid (1.75g, 0.01 moles) for 4-methyl-2-thioxo-4-thiazoline-3-propionic acid gives the title compound, 1.47 g; mp. 142°–144°C. (d); $\lambda_{max}^{KBr}$ 5.60, 5.78, 5.97 $\mu$; NMR has 2.08 ppm singlet.

Elemental Analysis for $C_{15}H_{15}N_3O_6S_3$: Calc'd: C, 41.96; H, 3.52; N, 9.79; S, 22.41. Found: C, 42.05; H, 3.73; N, 9.46; S, 23.05.

The sodium salt of the above compound is prepared by slurrying the compound (5.0 g, 0.0118 moles) in water (160 ml) at 5°C and adding dropwise over 15 minutes 1M sodium hydroxide (11.7 ml, 0.0117 moles) giving a final pH 5.8. The mixture is filtered and freeze-dried to give the sodium salt of the title compound, 3.87 g colorless solid; mp. 205°–230°C. (d); $\lambda_{max}^{KBr}$ 5.63, 5.75 (shoulder), 5.96 $\mu$; NMR has 2.07 ppm singlet.

Elemental Analysis for $C_{15}H_{14}N_3O_6S_3Na.1\ 1/2H_2O$: Calc'd: C, 37.62; H, 3.58; N, 8.78; S, 20.11. Found: C, 37.58; H, 3.25; N, 8.66; S, 18.98.

| BA SU | 6633 | .061 |
|---|---|---|
| ST AU | 6538P | .244 |
| ST AU | Smith | .244 |
| ST AU | CHP | .976 |
| ST AU | 53–180 | .976 |
| NE CA | 8193 | 62.5 |
| ES CO | 9637 | 7.81 |
| ES IN | 65–1 | 125 |
| SA PA | 11737 | 1.95 |
| EN AE | 13048 | 125 |
| KL PN | 10031 | 1.95 |
| BO BR | 4617 | 7.81 |
| PR VU | 6896 | 7.81 |

EXAMPLE 14

3-Methyl-8-oxo-7[2-(2-thioxo-4-thiazolin-3-yl)acetamido]-5-thia-1-azabicyclo[4.2.0]oct-2-ene-2-carboxylic acid.

Using the method described in Example 5 but substituting 2-thioxo-4-thiazolidine-3-acetic acid (1.75 g, 0.01 moles) for 4-methyl-2-thioxo-4-thiazoline-3-propionic acid gives the title compound, 1.07 g; mp. 92°–96°C. (d); $\lambda_{max}^{KBr}$ 5.62, 5.84, 6.00 $\mu$ (shoulder); NMR has 2.03 ppm singlet.

Elemental Analysis for $C_{13}H_{13}N_3O_4S_3$: Calc'd: C, 42.05; H, 3.53; N, 11.32; S, 25.91. Found: C, 43.48; H, 4.16; N, 9.46; S, 22.16.

The sodium salt of the above compound is prepared by slurrying the compound (3.50 g, 0.00945 moles) in water (85 ml) at 5°C and adding dropwise over 15 minutes 1M sodium hydroxide (9.45 ml, 0.00945 moles) giving a final pH 6.0. The mixture is filtered and freeze-dried to give the sodium salt of the title compound, 3.25 g; mp. 210°–225°C. (d); $\lambda_{max}^{KBr}$ 3.00, 5.68 $\mu$; NMR has 1.97 ppm singlet.

Elemental Analysis for $C_{13}H_{12}N_3O_4S_3Na.1\ H_2O$: Calc'd: C, 37.97; H, 3.44; N, 10.22; S, 23.40; $H_2O$, 4.38. Found: C, 38.38; H, 3.43; N, 10.15; S, 21.85; $H_2O$, 7.53.

| BA SU | 6633 | .976 |
|---|---|---|
| ST AU | 6538P | 3.90 |
| ST AU | Smith | 3.90 |
| ST AU | CHP | 15.6 |
| ST AU | 53–180 | 7.81 |
| ES CO | 9637 | 125 |
| SA PA | 11737 | 62.5 |
| KL PN | 10031 | 62.5 |
| PR VU | 6896 | 250 |

EXAMPLE 15

6-[2-(2-Thioxo-4-thiazolin-3-yl)acetamido]penicillanic acid.

Using the method described in Example 5 but substituting 6-APA (2.16 g, 0.01 moles) for 7-ADCA and 2-thioxo-4-thiazolidine-3-acetic acid (1.75 g, 0.01 moles) for 4-methyl-2-thioxo-4-thiazoline-3-propionic acid gives the title compound,1.65 g; mp. 102°–106°C. (d); $\lambda_{max}^{KBr}$ 5.55 (shoulder), 5.70, 5.91 $\mu$ (shoulder); NMR has 1.10, 1.21, 1.51 ppm singlets.

Elemental Analysis for $C_{13}H_{15}N_3O_4S_3$: Calc'd: C, 41.80; H, 4.05; N,11.25; S, 25.76. Found: C, 41.06; H, 9.38; N, 9.33; S, 23.92.

| BA SU | 6633 | .976 |
|---|---|---|
| ST AU | 6538P | .488 |
| ST AU | Smith | .488 |
| ST AU | CHP | 15.6 |
| ST AU | 53–180 | 62.5 |
| NE CA | 8193 | 7.81 |
| ES CO | 9637 | 250 |
| SA PA | 11737 | 7.81 |
| PR VU | 6896 | 125 |

EXAMPLE 16

7-[4-(Methylthio)-2-(4-methyl-2-thioxo-4-thiazolin-3-yl)butyramido]cephalosporanic acid.

Using the method described in Example 3 but substituting 7-ACA (2.72 g, 0.01 moles) for 6-APA and 4-methyl-α-(2-methylthioethyl)-2-thioxo-4-thiazoline-3-acetic acid (2.63 g, 0.01 moles) for 4-methyl-2-thioxo-4-thiazoline-3-acetic acid gives the title compound, 3.51 g; mp. 94°–98°C.; $\lambda_{max}^{KBr}$ 5.58, 5.75 $\mu$; NMR has 2.03 ppm singlet.

Elemental Analysis for $C_{19}H_{23}N_3O_6S_4$: Calc'd: C, 44.08; H, 4.48; N, 8.12; S, 24.78. Found: C, 43.59; H, 4.60; N, 8.08; S, 21.74.

| BA SU | 6633 | 7.81 |
|---|---|---|
| ST AU | 6538P | 15.6 |
| ST AU | Smith | 7.81 |
| ST AU | CHP | 62.5 |
| ST AU | 53–180 | 31.3 |
| ES CO | 9637 | 62.5 |
| ES IN | 65– | 125 |
| SA PA | 11737 | 62.5 |
| EN AE | 13048 | 250 |
| KL PN | 10031 | 62.5 |

EXAMPLE 17

3-Methyl-7-[4-(methylthio)-2-(4-methyl-2-thioxo-4-thiazolin-3-yl)butyramido]-8-oxo-5-thia-1-azabicyclo[4.2.0]oct-2-ene-2-carboxylic acid.

Using the method described in Example 3 but substituting 7-ADCA (2.14 g, 0.01 moles) for 6-APA and 4-methyl-α-(2-methylthioethyl)-2-thioxo-4-thiazoline-3-acetic acid (2.63 g, 0.01 moles) for 4-methyl-2-thioxo-4-thiazoline-3-acetic acid gives the title compound, 2.39 g; mp. 81°–85°C.; $\lambda_{max}^{KBr}$ 5.67, 5.82 (shoulder), 5.92 μ (shoulder); NMR has 2.02 ppm singlet.

Elemental Analysis for $C_{17}H_{21}N_3O_4S_4$: Calc'd: C, 44.42; H, 4.65; N, 9.14; S, 27.90. Found: C, 44.32; H, 4.81; N, 8.39; S, 29.13.

| BA SU | 6633 | 7.81 |
|-------|------|------|
| ST AU | 6538P | 31.3 |
| ST AU | Smith | 31.3 |
| ST AU | CHP | 250 |
| ST AU | 53–180 | 250 |

EXAMPLE 18

6-[4-(Methylthio)-2-(4-methyl-2-thioxo-4-thiazolin-3-yl)butyramido]penicillanic acid.

Using the method described in Example 3 but substituting 4-methyl-α-(2-methylthioethyl)-2-thioxo-4-thiazoline-3-acetic acid (2.63 g, 0.01 moles) for 4-methyl-2-thioxo-4-thiazoline-3-acetic acid gives the title compound, 3.08 g; mp. 102°–107°C.; $\lambda_{max}^{KBr}$ 5.57, 5.70 (shoulder); 5.88 μ; NMR has 1.51, 1.57, 2.07 ppm singlets.

Elemental Analysis for $C_{17}H_{23}N_3O_4S_4$: Calc'd: C, 44.23; H, 5.02; N, 9.10; S, 27.78. Found: C, 44.40; H, 5.18; N, 9.20; S, 21.57.

| BA SU | 6633 | 1.95 |
|-------|------|------|
| ST AU | 6538P | 1.95 |
| ST AU | Smith | 1.95 |
| ST AU | CHP | 31.3 |
| ST AU | 53–180 | 31.3 |
| NE CA | 8193 | 7.81 |
| SA PA | 11737 | 125 |
| HE SP | 9955 | 250 |

What is claimed is:
1. A compound of the formula:

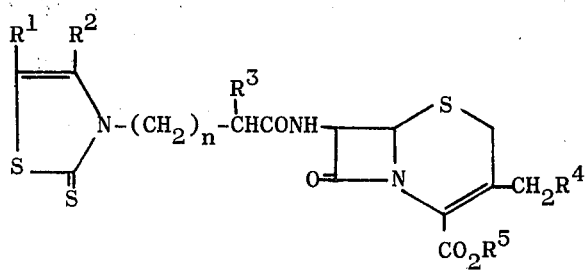

in which
$R^1$ and $R^2$ are independently —H or alkyl of 1 to 6 carbon atoms, and when taken together, $R^1$ and $R^2$ are trimethylene;

$R^3$ is —H, alkyl of 1 to 6 carbon atoms or methylthioethyl;

$R^4$ is —H, (lower)alkanoyloxy, or

$R^5$ is —H, an alkali metal or the ammonium ion; and n is 0 or 1, with the proviso that when n is 1, $R^3$ is —H.

2. The compound of claim 1 which is 7-[2-(4-methyl-2-thioxo-4-thiazolin-3-yl)acetamido]cephalosporanic acid.

3. The compound of claim 1 which is 3-methyl-7-[2-(4-methyl-2-thioxo-4-thiazolin-3-yl)acetamido]-8-oxo-5-thia-1-azabicyclo[4.2.0]oct-2-ene-2-carboxylic acid.

4. The compound of claim 1 which is 7-[3-(4-methyl-2-thioxo-4-thiazolin-3-yl)propionamido]cephalosporanic acid.

5. The compound of claim 1 which is 3-methyl-7-[3-(4-methyl-2-thioxo-4-thiazolin-3-yl)propionamido]-8-oxo-5-thia-1-azabicyclo[4.2.0]oct-2-ene-2-carboxylic acid.

6. The compound of claim 1 which is 7-[2-(3,4,5,6-tetrahydro-2-thioxo-2H-cyclopentathiazol-3-yl)acetamido]cephalospianic acid.

7. The compound of claim 1 which is 3-methyl-8-oxo-7-[2-(3,4,5,6-tetrahydro-2-thioxo-2H-cyclopentathiazol-3-yl)-acetamido]-5-thia-1-azabicyclo[4.2.0]oct-2-ene-2-carboxylic acid.

8. The compound of claim 1 which is 7-[2-(4-methyl-2-thioxo-4-thiazolin-3-yl)propionamido]cephalosporanic acid.

9. The compound of claim 1 which is 3-methyl-7-[2-(4-methyl-2-thioxo-4-thiazolin-3-yl)propionamido]-8-oxo-5-thia-1-azabicyclo[4.2.0]oct-2-ene-2-carboxylic acid.

10. The compound of claim 1 which is 7-[2-(2-thioxo-4-thiazolin-3-yl)acetamido]cephalosporanic acid.

11. The compound of claim 1 which is 3-methyl-8-oxo-7-[2-(2-thioxo-4-thiazolin-3-yl)acetamido]-5-thia-1-azabicyclo-[4.2.0]oct-2-ene-2-carboxylic acid.

12. The compound of claim 1 which is 7-[4-(methylthio)-2-(4-methyl-2-thioxo-4-thiazolin-3-yl)butyramido]cephalosporanic acid.

13. The compound of claim 1 which is 3-methyl-7-[4-(methylthio)-2-(4-methyl-2-thioxo-4-thiazolin-3-yl)butyramido]-8-oxo-5-thia-1-azabicyclo[4.2.0]oct-2-ene-2-carboxylic acid.

* * * * *